United States Patent
Babazadeh et al.

(10) Patent No.: US 9,998,008 B2
(45) Date of Patent: Jun. 12, 2018

(54) ACTIVE TRANSIENT RESPONSE FOR DC-DC CONVERTERS

(71) Applicant: Infineon Technologies Austria AG, Villach (AT)

(72) Inventors: Amir Babazadeh, Irvine, CA (US); Benjamim Tang, Rancho Palos Verdes, CA (US)

(73) Assignee: Infineon Technologies Austria AG, Villach (AT)

( * ) Notice: Subject to any disclaimer, the term of this patent is extended or adjusted under 35 U.S.C. 154(b) by 134 days.

(21) Appl. No.: 13/737,331

(22) Filed: Jan. 9, 2013

(65) Prior Publication Data

US 2014/0191736 A1    Jul. 10, 2014

(51) Int. Cl.
*H02M 3/156* (2006.01)
*H02M 3/158* (2006.01)

(52) U.S. Cl.
CPC ....... *H02M 3/1582* (2013.01); *H02M 3/1588* (2013.01); *H02M 3/156* (2013.01); *H02M 3/158* (2013.01); *H02M 2003/1566* (2013.01); *Y02B 70/1466* (2013.01)

(58) Field of Classification Search
CPC .... H02M 3/1588; H02M 3/156; H02M 3/158; H02M 3/155; H02M 3/1582; H02M 3/157; H02M 3/1563
USPC .................. 323/271, 272, 282–285; 322/271
See application file for complete search history.

(56) References Cited

U.S. PATENT DOCUMENTS

| | | | |
|---|---|---|---|
| 3,913,002 A * | 10/1975 | Steigerwald et al. | 363/18 |
| 4,571,499 A * | 2/1986 | Wein | 307/75 |
| 5,134,537 A * | 7/1992 | Buss et al. | 361/154 |
| 7,436,162 B2 | 10/2008 | Walters | |
| 7,518,346 B2 * | 4/2009 | Prexl et al. | 323/222 |
| 7,521,913 B2 | 4/2009 | Tang et al. | |
| 7,710,084 B1 * | 5/2010 | Guo | G01R 19/003 323/224 |
| 7,825,642 B1 * | 11/2010 | Young | H02M 3/157 323/224 |
| 7,919,955 B2 | 4/2011 | Tang et al. | |
| 8,134,354 B2 | 3/2012 | Tang et al. | |
| 8,207,720 B2 * | 6/2012 | Tang et al. | 323/271 |
| 8,421,425 B1 * | 4/2013 | Wu | G01R 19/25 323/223 |
| 8,519,684 B2 * | 8/2013 | Chuang et al. | 323/271 |
| 2006/0001408 A1 * | 1/2006 | Southwell et al. | 323/282 |

(Continued)

FOREIGN PATENT DOCUMENTS

| CN | 101667776 A | 3/2010 |
|---|---|---|
| CN | 102158080 A | 8/2011 |

(Continued)

*Primary Examiner* — Timothy J Dole
*Assistant Examiner* — Bryan R Perez
(74) *Attorney, Agent, or Firm* — Murphy, Bilak & Homiller, PLLC (57) ABSTRACT

A first power transistor of a DC-DC converter is connected between a voltage supply node and a common node, a second power transistor is connected between a reference node and the common node, and an inductor is connected between the common node and the output node of the DC-DC converter. A controller switches the first transistor off and the second transistor off during a step-down event at the load if current in the inductor exceeds a positive threshold value.

22 Claims, 8 Drawing Sheets

(56) References Cited

U.S. PATENT DOCUMENTS

| | | | |
|---|---|---|---|
| 2006/0055388 A1* | 3/2006 | Tang et al. ................... | 323/284 |
| 2006/0114700 A1 | 6/2006 | Durbaum et al. | |
| 2006/0132110 A1* | 6/2006 | Tang ............................ | 323/282 |
| 2006/0152205 A1* | 7/2006 | Tang et al. ................... | 323/284 |
| 2008/0309299 A1* | 12/2008 | Wei ...................... | H02M 3/156 |
| | | | 323/247 |
| 2009/0121695 A1 | 5/2009 | Pierson et al. | |
| 2009/0140708 A1* | 6/2009 | Tateishi et al. .............. | 323/282 |
| 2010/0072968 A1* | 3/2010 | Bianco et al. ............... | 323/284 |
| 2010/0327836 A1* | 12/2010 | Li et al. ....................... | 323/283 |
| 2011/0234255 A1* | 9/2011 | Chobot ..................... | 324/764.01 |
| 2012/0043949 A1* | 2/2012 | Nakamura ................... | 323/271 |
| 2012/0056659 A1* | 3/2012 | Chuang et al. .............. | 327/427 |
| 2012/0212195 A1 | 8/2012 | Kushida et al. | |
| 2012/0229111 A1* | 9/2012 | Serdarevic .................. | 323/282 |
| 2012/0236615 A1* | 9/2012 | Kitabatake ............ | H01L 27/088 |
| | | | 363/131 |
| 2013/0207625 A1* | 8/2013 | Futamura .................... | 323/271 |

FOREIGN PATENT DOCUMENTS

| | | |
|---|---|---|
| CN | 102594146 A | 7/2012 |
| JP | 2007151271 A | 6/2007 |

* cited by examiner

ACTIVE TRANSIENT RESPONSE FOR DC-DC CONVERTERS

FIELD OF TECHNOLOGY

The present application relates to DC-DC converters, in particular active transient response for DC-DC converters.

BACKGROUND

For DC-DC converters, fast transient response is critical for high speed contemporary devices. Telecommunications systems, networking systems, servers, and processor-based systems are all examples of applications that employ high-speed devices. Microprocessors and custom ASICs (application-specific integrated-units), for example, have load requirements that can quickly change from a more or less idle state to full load and back to the idle state, demanding rapid increase and decrease in current. In addition, fast dynamic voltage transition may be required to raise or lower the regulated voltage depending on the operating mode. If a DC-DC converter is unable to quickly respond to the step-up and step-down load event or dynamic voltage transitions, the output voltage of the converter may go outside the desired regulation window, possibly causing damage or improper operation of the microprocessor or ASIC.

Some DC-DC converters have an active transient response (ATR) unit for mitigating step-down load events. These controllers are not limited by synchronous control of the power switches, where the pulse width duty cycle is modulated on a cycle-by-cycle basis to control the output voltage. In conventional buck converter synchronous control, the high side power transistor is in a conductive state (on) and the low side power transistor is in a non-conductive state (off) for a portion of a switch cycle, then the high side power transistor is off and the low side power transistor is on for the remainder of the switch cycle. Controllers with ATR units typically support both an ATR low (ATRL) state or an ATR high impedance (ATRL_HiZ) state to control voltage overshoot during a step-down load event.

In the ATRL state, the high-side power transistor is off and the low-side power transistor is on for one or more switch cycles, so that negative or positive current can flow from the output inductor through the low-side transistor in order to rapidly lower the output voltage. In the ATRL_HiZ state, both the high-side and low-side power transistors are off, so the converter power stage is switched to a high impedance (tri-state or HiZ) state so that the current in the output inductor more rapidly dissipates through the body diode of the low-side transistor, but the current cannot go negative in this state. Conventional ATR units employ or select one of these two states and do not switch from the ATRL_HiZ state to the ATRL low state when the inductor current reaches zero. However doing so can leave the ATR unit in the ATRL_HiZ state too long, which is problematic because it may lead to poor load transient or dynamic voltage response. It can also be problematic if drivers enter a low power sleep mode when its input is tri-stated for too long.

SUMMARY

According to the embodiments described herein, a DC-DC converter includes an active transient response (ATR) unit which can place the low-side power transistor(s) of the converter in either an ATR low (ATRL) state or an ATR high impedance (ATRL_HiZ) state during a step-down load event depending on various considerations. The step-down load event can be a load releasing or unloading event, or the release of inductor current due to dynamic voltage transitioning. In the ATRL_HiZ state, both the high-side and low-side power transistors of the converter power stage are off and the power stage is tri-stated so that the current in the output inductor rapidly dissipates through the body diode of the low-side transistor. In the ATRL state, the high-side power transistor is off and the low-side power transistor is switched on so that negative or positive current can flow from the output inductor through the low-side transistor in order to rapidly lower the output voltage. The ATR unit intelligently decides when to implement which of these states based on various conditions in a manner that improves the output voltage response of the converter over large step-down load events. In response to a large step-down load event, the ATR unit activates either the ATRL or ATRL_HiZ state, depending on the sensed current. Various parameters are monitored by the ATR unit to ensure the converter does not remain in one state too long, thus yielding a voltage output response with a more ideal shape. Once the step-down load event subsides, the ATR unit returns switching control of the converter power stage to the controller of the DC-DC converter.

According to an embodiment of a DC-DC converter having an output node for connecting to a load, the DC-DC converter comprises a first power transistor connected between a voltage supply node and a common node, a second power transistor connected between a reference node and the common node, and an inductor connected between the common node and the output node. A controller is operable to switch the first transistor off and the second transistor off during a step-down event at the load if current in the inductor exceeds a positive threshold value.

According to an embodiment of a method of operating a DC-DC converter having an output node connected to a load, the method comprises: switching the first and second transistors via a variable duty cycle control signal to deliver current to the load through the inductor; switching the first transistor off during a step-down event at the load; and switching the second transistor off during the step-down event irrespective of the state of the variable duty cycle control signal if current in the inductor exceeds a positive threshold value.

According to an embodiment of a multi-phase DC-DC converter, the regulator comprises a power stage including a plurality of phases, each phase having a high-side transistor and a low-side transistor for coupling to a load through a respective inductor. A pulse width modulator is operable to switch the phases of the power stage via a variable duty cycle control signal for delivering current to the load through one or more of the inductors. A transient response unit is operable to switch the high-side transistors off and the low-side transistors off during a step-down event at the load if a measured inductor current in any of the inductors or collectively in all of the inductors exceeds a positive threshold value.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein employ active transient response (ATR) in a DC-DC converter which intelligently decides when to place the low-side power transistor(s) of the converter in either an ATR low (ATRL) state or an ATR high impedance (ATRL_HiZ) state in a manner that improves the output voltage response of the converter over large step-down load events. DC-DC converters transfer power from the input source to the load by alternatively energizing and de-energizing an inductor or transformer. These cycles are controlled by a set of switches or pass devices of a power stage, and the voltage or current transfer is controlled by varying the duty cycle, or ratio of on-to-off time in these switches. The DC-DC controller monitors and maintains the output variables (voltage and current) by adjusting the duty cycle through feedback compensation. In response to a step-down load event such as a load releasing or unloading event or inductor current release due to dynamic voltage transitioning, the converter implements ATR in a way that improves the output voltage response of the converter during the transient event.

ATR is realized by providing ATRL and ATRL_HiZ states for the low-side power transistor(s) of the converter and intelligently deciding when to implement which of these states based on various conditions. In the ATRL_HiZ state, both the high-side and low-side power transistors of the converter power stage are switched off to place the power stage in a high impedance state (i.e. tri-stated) so that the current in the output inductor rapidly dissipates through the body diode of the low-side transistor. In the ATRL state, the high-side power transistor remains switched off and the low-side power transistor is switched on in a conducting state so that negative or positive current can flow from the output inductor through the low-side transistor in order to rapidly lower the output voltage. In response to a large step-down load event, the ATR unit activates either the ATRL or ATRL_HiZ state, depending on the sensed current. Various parameters are monitored by the ATR unit to ensure the converter power stage does not remain in one state too long, thus yielding a voltage output response with a more ideal shape. Once the step-down load event subsides, the ATR unit returns switching control of the power stage to the controller of the DC-DC converter.

Figure 1:
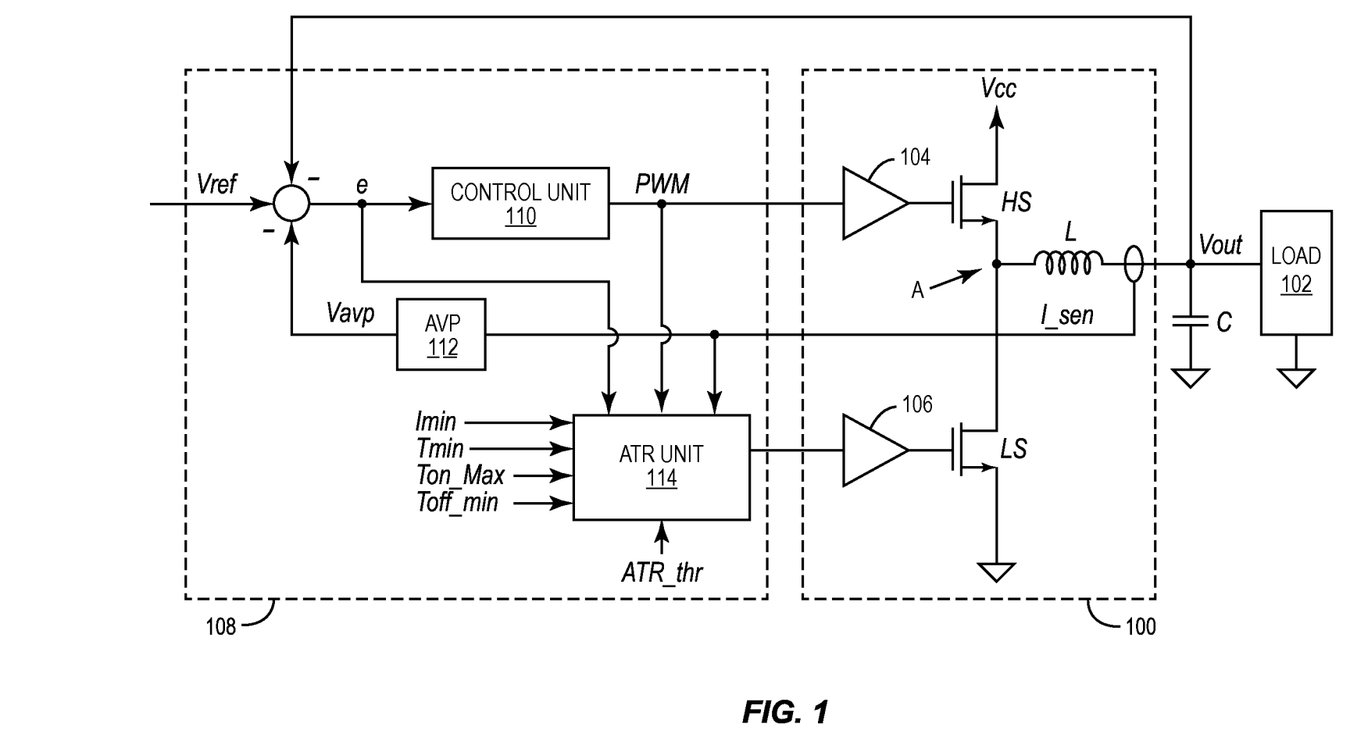
FIG. 1 illustrates a block diagram of a DC-DC converter having an ATR unit.

FIG. 1 illustrates a block diagram of an embodiment of a switched mode buck converter which includes a power stage 100 coupled to a load 102 such as a microprocessor, graphics processor, network processor, digital signal processor, ASIC, etc. The power stage 100 is shown with a single phase in FIG. 1, but can include multiple phases if desired. Each phase has a high-side power transistor (HS) driven by a first driver 104 and a low-side power transistor (LS) driven by a second driver 106. The high-side power transistor is connected between a voltage supply node (VCC) and a common node (A). The low-side power transistor is connected between a reference node (e.g. ground) and the common node. Each phase of the power stage 100 also has an inductor (L) connected between the common node and the output node (Vout). The inductor is connected in series with the load 102 and delivers current to the load 102. The amount of current provided by each output phase depends on the switch state of the high-side and low-side transistors of that phase. An output capacitor (C) stores a large amount of energy at the output of the converter. The output capacitor can be a single capacitor or a bank of capacitors connected in parallel.

Operation of the power stage 100 is controlled via PWM (pulse width modulation) control implemented by a controller 108. The controller 108 includes a PWM control unit 110 that generates a PWM control signal (PWM) for each phase of the power stage 100. Each cycle of the PWM control signal has an on-portion and an off-portion. The high-side transistor of the output phase control by the PWM signal is switched on (i.e. into a conducting state) during the on-portion of each PWM cycle and the low-side transistor is switched off (i.e. into a non-conducting state). Conversely, the low-side transistor is switched on during the off-portion of each PWM cycle and the high-side transistor is switched off.

The duty cycle (d) of the PWM control signal determines how long the high-side and low-side transistors are switched on during each PWM cycle, respectively, and therefore the amount of current sourced by that output phase to the load 102. The PWM control signal(s) are generated based on the difference between a reference voltage (Vref) provided to the converter and the output voltage (Vout). In some embodiments, the reference voltage corresponds to a voltage identification (VID) associated with the load 102. The VID determines the regulator load set-point i.e. the target voltage of the regulator when the load current is zero.

The DC-DC converter further includes an adaptive voltage positing (AVP) unit 112 that generates an offset (Vavp) to the reference voltage (Vref) by an amount proportional to the sensed inductor current (I_sen) for each output phase of the power stage 100. The AVP unit 112 can comprise an amplifier and an AVP filter. In general, the controller 108 can implement any conventional AVP loop. AVP in the context of DC-DC converters is well known, and therefore no further explanation is given in this regard. The difference between Vref and Vout and Vavp constitutes an error signal (e) which is input to the PWM control unit 110 of the controller 108. In one embodiment, the PWM control unit 110 includes a PID (proportional-integral-derivative) filter which implements a compensator transfer function with the error voltage (e) as an input and duty cycle as the output.

The duty cycle output is adjusted in response to the load conditions, based on the output voltage and inductor feedback information (Vout, I_sen). For example, the duty cycle can be adjusted by pulse widening or narrowing. As such, the duty cycle of each PWM control signal provided to the power stage 100 of the DC-DC converter is set based on the offset (Vavp) generated by the AVP unit 112, the output voltage (Vout) and the reference voltage (Vref). Under transient load conditions, including a large step-down in the load current, an active transient response (ATR) unit 114 included in or associated with the controller 108 implements the ATR functions described herein.

During steady state regulation, the voltage at the load 102 closely matches the regulator target voltage set by Vref. During a transient load event, the voltage at the load 102 deviates from the target voltage and the magnitude of the load event can be detected by using the ATR unit 114 that detects an excessive amplitude deviation. For example a comparator could be used that triggers an ATR event when the voltage at the load 102 exceeds the target voltage by a minimum threshold. Alternatively, the ATR unit 114 can wait until the PWM control signal goes to zero and detect the zero duty cycle PWM signal as the ATR event. In each case, the ATR unit 114 intelligently decides when to place the power stage 100 in either the ATRL state or the ATRL_HiZ state in a manner that improves the output voltage response of the converter over large step-down load events. For example in response to a large step-down load event, the ATR unit 114 activates either the ATRL or ATRL_HiZ state, depending on the sensed phase current (I_sen). Various parameters are monitored by the ATR unit 114 to ensure the power stage 100 does not remain in one state too long, thus yielding a voltage output response with a more ideal shape.

Figure 2:
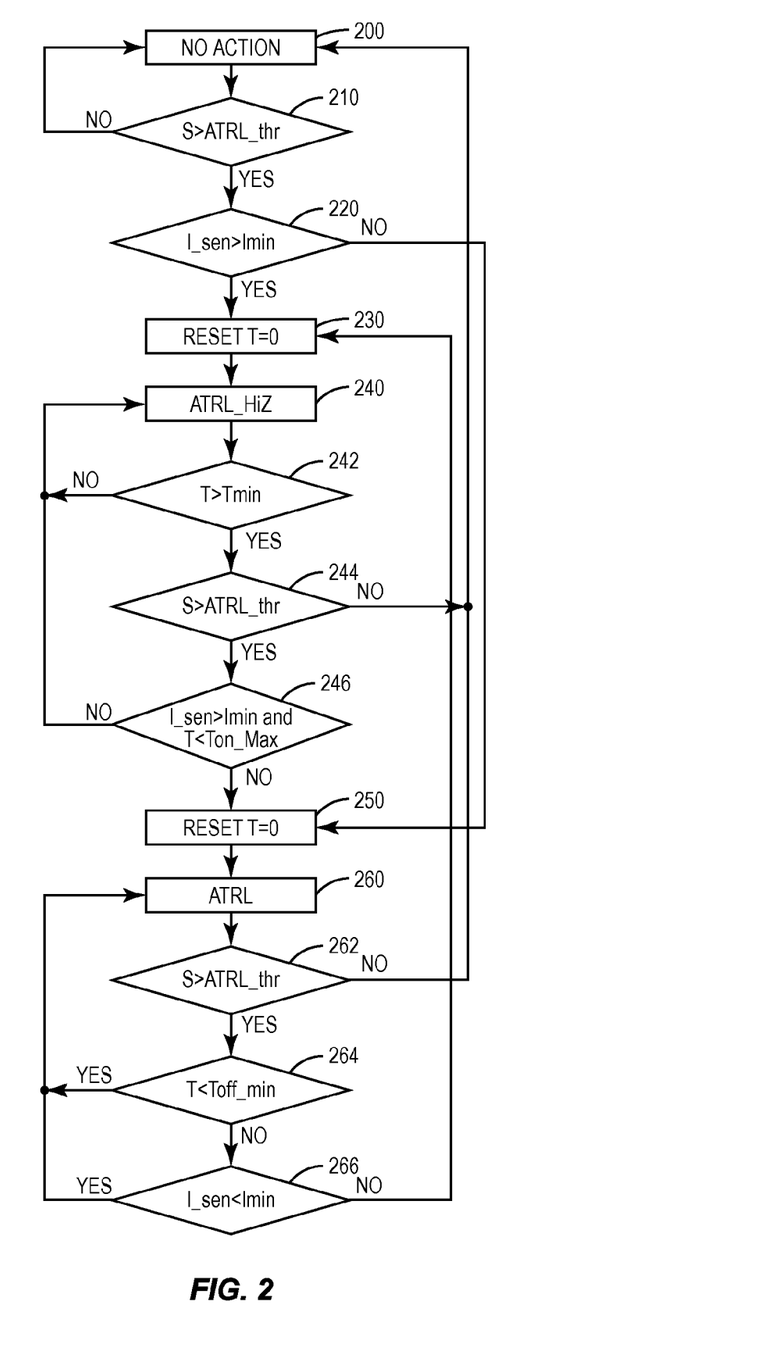
FIG. 2 illustrates a flow diagram of an embodiment of active transient response for a DC-DC converter.

FIG. 2 illustrates a flow diagram of an ATR method implemented by the ATR unit 114. The ATR unit 114 takes no action unless there is a step-down load event i.e. an ATR event (block 200). If an ATR indicator (S) provided to or generated by the ATR unit 114 exceeds a positive threshold value (ATR_thr), a step-down load event is detected (block 210). In one embodiment, S is a function of the sensed inductor current (I_sen) and the error voltage (e) i.e. S represents a combination of inductor current and the voltage error. In another embodiment, a step-down load event is detected when the duty cycle of the PWM control signal (PWM) is zero. In yet another embodiment, S is implemented as a comparator which trips when e>ATR_thr, so an ATR event is detected by this module.

When a step-down load event is detected, the ATR unit 114 determines whether the sensed inductor current (I_sen) exceeds a minimum positive threshold value (Imin) (block 220). For a single-phase power stage 100, I_sen is the inductor current of that phase. For a multi-phase converter, I_sen can be the individual phase currents (i.e. the individual phase currents are individually compared to Imin) or a total of all the phase currents.

In each case, if I_sen>Imin, a timer (T) is reset to zero (block 230) and the ATR unit 114 then places the power stage 100 in the ATRL_HiZ state (block 240). In the ATRL_HiZ state, both the high-side and low-side power transistors are switched off to tri-state the converter power stage so that the current in the output inductor (L) rapidly dissipates through the body diode of each low-side transistor. The ATR unit 114 maintains the power stage 100 in the ATRL_HiZ state for a minimum amount of time (Tmin) (block 242). After this time period passes, the ATR unit 114 continues to maintain the power stage 100 in the ATRL_HiZ state so long as the step-down load event continues to subsist i.e. S>ATH_thr (block 244), and I_sen remains greater than Imin and the power stage 100 has not been in the ATRL_HiZ state for too long i.e. T<Ton_Max where Ton_Max is the maximum amount of time the low-side transistors are permitted to be switched off and the power stage 100 tri-stated (block 246). In one embodiment, Ton_Max is selected so that each low-side transistor is switched on to the conducting state before the driver 106 of the low-side transistor enters a low power sleep mode even if the inductor current (I_sen) remains above the threshold value (Imin) during the step-down load event.

If any of these conditions do not continue to be satisfied (i.e. S<ATH_thr, I_sen<Imin, and/or T>Ton_Max), the ATR unit 114 resets counter T (block 250) and places the power stage 100 in the ATRL state (block 260). In the ATRL state, each high-side power transistor is switched off and each low-side power transistor is switched on so that negative or positive current can flow from the respective output inductor through the corresponding low-side transistor in order to rapidly lower the output voltage (Vout) of the converter. The ATR unit 114 also places the power stage 100 in the ATRL state if I_sen is not greater than Imin when the step-down load event is first detected (blocks 220, 250 and 260).

The power stage 100 remains in the ATRL state so long as the step-down load event subsists (block 262), a minimum amount of time (Toff_min) has not yet passed in the ATRL state (block 264), and I_sen remains less than Imin (block 266). The parameter Toff_min ensures the low-side power transistor is on for a sufficient amount of time (T) prior to the power stage being tri-stated. Otherwise, the ATR unit 114 places the power stage 100 back into the ATRL_HiZ state (blocks 266 and 230) or returns control of the power stage 100 to the controller 108 (blocks 262 and 200).

FIGS. 3 through 6 illustrate the behavior of the ATR unit 114 under different types of step-down load events (labeled 'ATR Event' in FIGS. 3 through 6). During a step-down load event, the ATR unit 114 overrides the PWM control signal to the gate of each low-side power transistor included in the power stage 100 of the converter. The override signal applied to the gate of each low-side power transistor is labeled 'LS_Gate' and the override signal applied to the gate of each high-side power transistor is labeled 'HS_Gate' in FIGS. 3 through 6.

Figure 3:
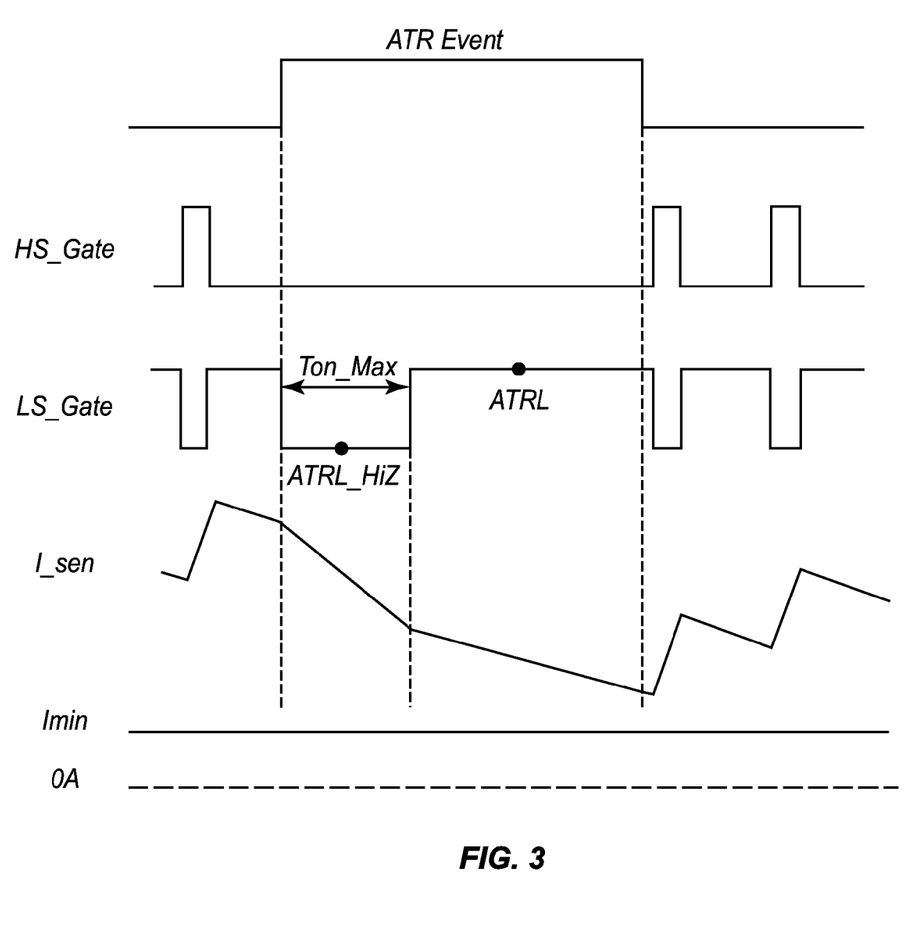
FIGS. 3 through 6 illustrate the behavior of the ATR unit under different types of step-down load events.

In FIG. 3, the inductor current (I_sen) is greater than Imin when the step-down load event first occurs. In response, the ATR unit 114 places the power stage 100 in the ATRL_HiZ state with both the high-side and low-side power transistors switched off. After the time period Ton_Max expires, I_sen still remains above Imin in this case (Imin is set above 0 A in this case, and can be programmable and set to any desired value including 0 A). In response, the ATR unit 114 places the power stage 100 in the ATRL state by switching the low-side transistor to the conducting state while the high-side transistor remains off. The power stage 100 remains in the ATRL state until the step-down load event subsides.

The Ton_Max time limit parameter ensures the low-side transistor is not switched off too long, e.g. thereby avoiding the driver 106 of the low-side transistor entering a low power sleep mode. Utilizing the Ton_Max time limit parameter is also advantageous when a large step-down in the load current occurs from a high value (e.g. around 200 A) to a medium value (e.g. around 40 A). In this case, the load current never drops to 0 A i.e. from a high or medium value to a low value. Yet, the power stage 100 does not remain in the ATRL_HiZ state during the entire step-down load event. Instead, the power stage 100 is switched from the ATRL_HiZ state to the ATRL state when the Ton_Max time limit expires by forcing the low-side power transistor into the conducting state. Doing so reduces overshoot in the converter output voltage (Vout), because the inductor current dissipates less rapidly in the ATRL state since the body diode of the low-side transistor no longer conducts (or conducts only slightly) in the ATRL state.

Figure 4:
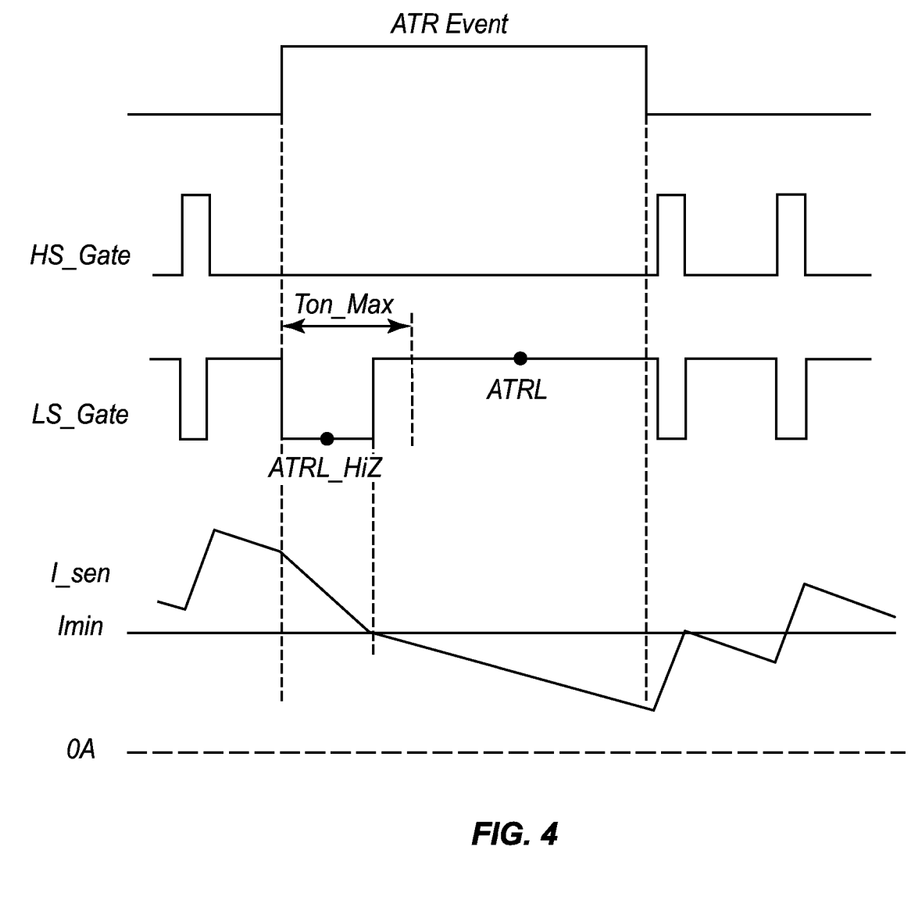

In FIG. 4, the inductor current (I_sen) is greater than Imin when the step-down load event first occurs. In response, the ATR unit 114 places the power stage 100 in the ATRL_HiZ state with both the high-side and low-side power transistors switched off. Before the time period Ton_Max expires, I_sen drops below Imin. In response, the ATR unit 114 places the power stage 100 in the ATRL state by switching the low-side transistor to the conducting state even though Ton_Max has not yet expired during the transient load current. The high-side transistor remains switched off. The power stage 100 remains in the ATRL state until the step-down load event subsides. In one embodiment, Imin can be set above 0 A to further reduce undershoot in the converter output voltage (Vout) which can otherwise occur at a 0 A switching point.

Figure 5:
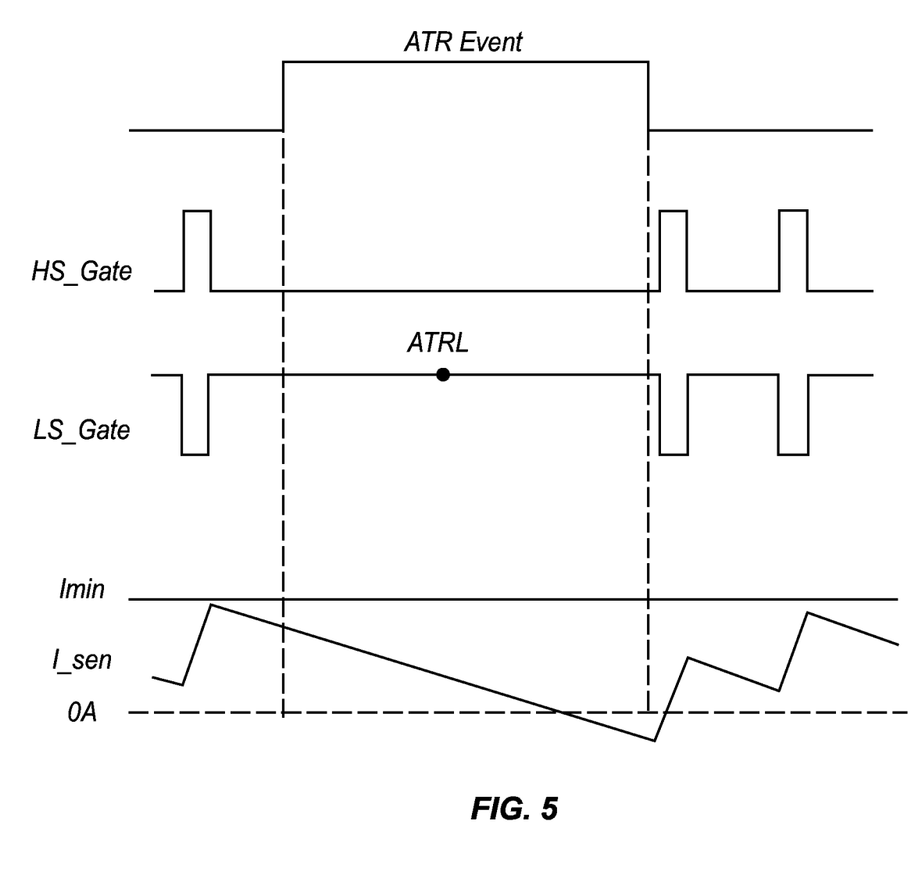

In FIG. 5, the inductor current (I_sen) is lower than Imin when the step-down load event first occurs. Accordingly, the ATR unit places the power stage in the ATRL state and maintains the power stage in the ATRL state during the entire step-down load event.

Figure 6:
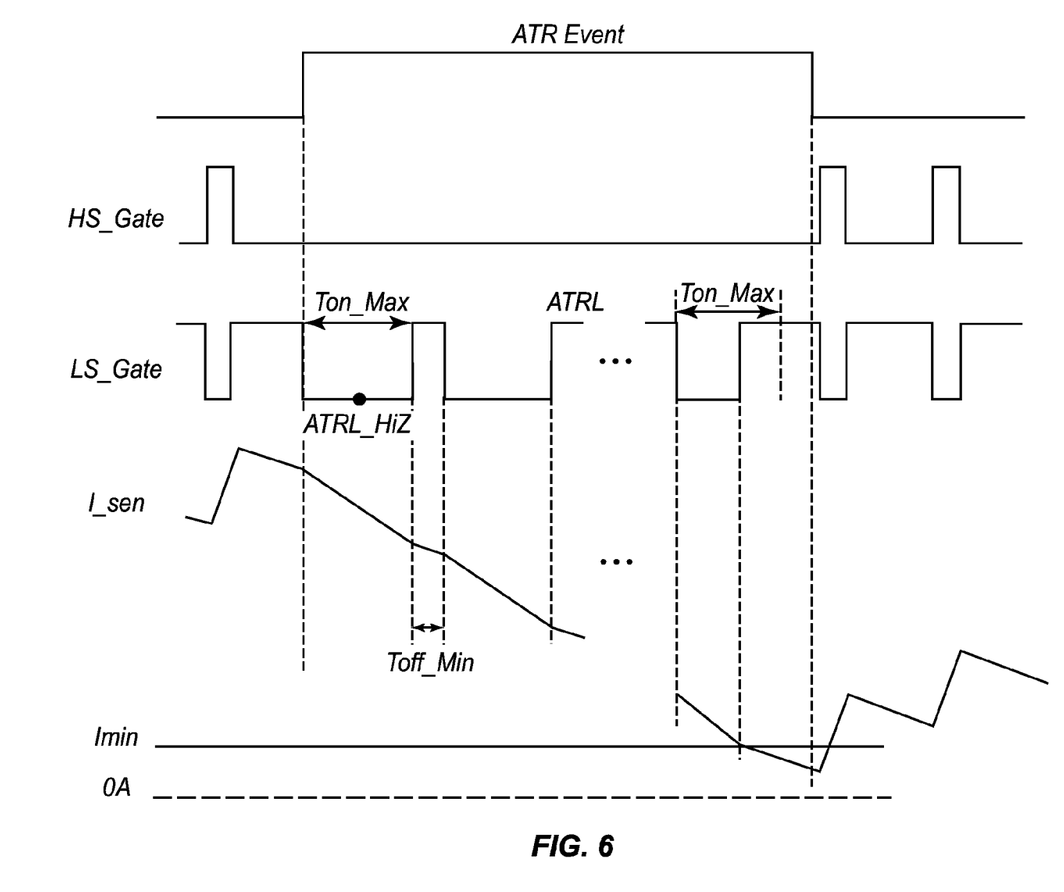

FIG. 6 shows a more generic response by the ATR unit 114 to a step-down load event. The inductor current (I_sen) is greater than Imin when the step-down load event first occurs. In response, the ATR unit 114 places the power stage 100 in the ATRL_HiZ state with both the high-side and low-side power transistors switched off. After the time period Ton_Max expires, I_sen still remains above Imin. In response, the ATR unit 114 places the power stage 100 in the ATRL state by switching the low-side transistor to the conducting state while the high-side transistor remains switched off. The power stage 100 remains in the ATRL state for a minimum time period (Toff_min). The parameter Toff_min ensures the low-side power transistor has sufficient recovery time prior to being switched off again.

After Toff_min expires, the ATR unit 114 evaluates whether the step-down load event still subsists and whether I_sen remains greater than Imin. If so, the ATR unit 114 forces the power stage 100 from the ATRL state to the ATRL_HiZ state by switching the low-side power transistor from the conducting state to a non-conducting state (i.e. off). This process continues (switching from ATRL_HiZ to ATRL and back to ATRL_HiZ) until the step-down load event subsides or I_sen drops below Imin. If I_sen drops below Imin before the time period Ton_Max expires, the ATR unit 114 transitions the power stage 100 from the ATRL_HiZ state to the ATRL state by again switching the low-side transistor from the non-conducting (off) state to the conducting state even though Ton_Max has not yet expired during the transient load current. The high-side transistor remains off. The power stage 100 remains in the ATRL state until the step-down load event subsides. When the step-down load event eventually subsides, the ATR unit 114 returns switching control of the power stage 100 to the PWM control unit 110 of the DC-DC converter.

Figure 7:
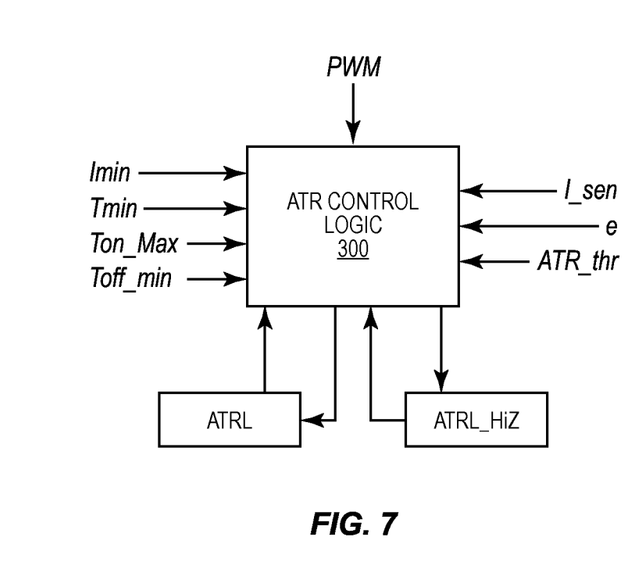
FIG. 7 illustrates a block diagram of a digital embodiment of the ATR unit.

FIG. 7 illustrates an embodiment of the ATR unit 114. According to this embodiment, the ATR unit 114 is implemented digitally e.g. as part of the controller 108 and includes control logic 300 for implementing the ATR-related functions previously described herein based on various control and feedback parameters (e.g. the PWM control signal, Imin, Tmin, Ton_Max, Toff_min, I_sen, e, and ATR_thr). FIG. 7 further illustrates the control implemented by the ATR control logic 300 over each low-side power transistor of the converter power stage 100. In one embodiment, the control logic 300 overrides the variable duty cycle control signal (PWM) input to each low-side power transistor during step-down load events. Depending on the state of the control and feedback parameters input to the control logic 300, the low-side transistor can be forced to switch on in the conducting state (represented by the box labeled 'ATRL' in FIG. 7) or forced to switch off in the non-conducting state (represented by the box labeled 'ATRL_HiZ' in FIG. 7) during all or part of a step-down load event. The control logic 300 determines the state of the low-side transistor e.g. in accordance with the flow diagram of FIG. 2 to yield the results shown in FIGS. 3 through 6 depending on the state of the control and feedback parameters during a step-down load event.

Figure 8:
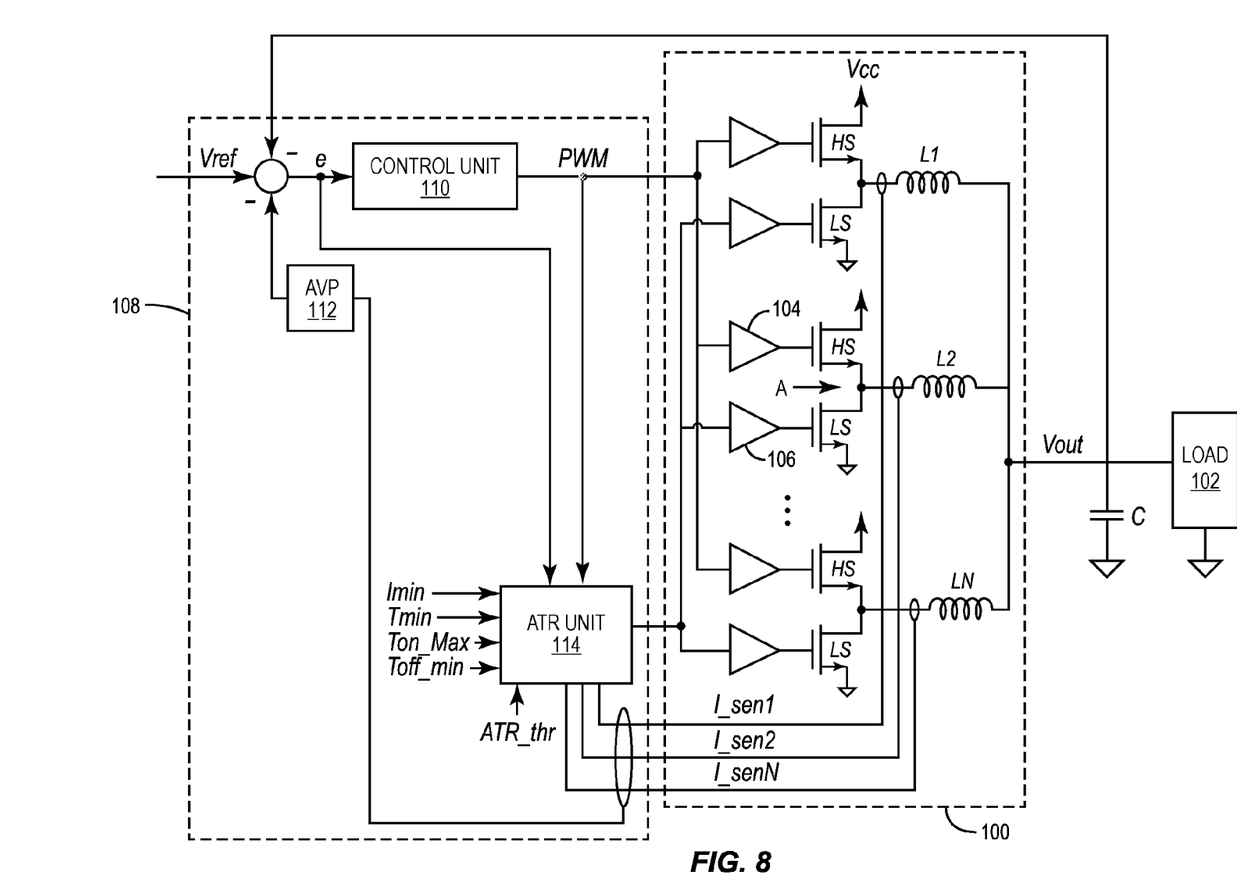
FIG. 8 illustrates a block diagram of a multi-phase DC-DC converter having an ATR unit.

FIG. 8 illustrates another embodiment of a DC-DC converter with an ATR unit 114. The embodiment illustrated in FIG. 8 is similar to the one illustrated in FIG. 1, however the converter is multi-phase in this embodiment. That is, the power stage 100 of the converter includes a plurality of output phases. Each phase has a high-side transistor (HS) and a low-side transistor (LS) for coupling to a load 102 through a respective inductor (L1, L2, . . . , LN). The PWM control unit 110 switches the phases of the power stage 100 via a variable duty cycle control signal (PWM) for delivering current to the load 102 through one or more of the phase inductors.

The ATR unit 114 switches the low-side transistors off during a step-down load event at the load 102 if the measured inductor current in any of the inductors (I_sen1, I_sen2, . . . , I_senN) or collectively in all of the inductors exceeds a positive threshold value (Imin). In one case, Imin is set based on each individual inductor current and the ATR unit 114 reacts accordingly when one of the inductor currents exceeds Imin. In another embodiment, Imin is set based on the total of all inductor currents and the ATR unit 114 reacts accordingly when the total inductor current exceeds Imin. In each case, the ATR unit 114 switches the low-side transistors from the non-conducting (off) state to the conducting state by switching on the transistors if the measured inductor current (on an individual or total basis) remains above Imin for a maximum time limit (Ton_Max) during the step-down load event e.g. as shown in FIG. 3. The ATR unit 114 can switch the low-side transistors from off to on if the measured inductor current (on an individual or total basis) drops below Imin before Ton_Max expires during the step-down load event e.g. as shown in FIG. 4. The maximum time limit (Ton_Max) can be selected so that the low-side transistors are switched from the non-conducting to the conducting state before the drivers 106 of the low-side transistors enter a low power sleep mode even if the measured inductor current (on an individual or total basis) remains above the positive threshold value during the step-down load event as previously described herein.

The power stage 100 can supply high current, medium current and low current to the load 102 via one or more of the phases depending on load demand. The ATR unit 114 can switch the low-side transistors from the non-conducting to the conducting state if the measured inductor current (on an individual or total basis) remains above the positive threshold value (Imin) for the maximum time limit during a high-to-medium step-down load event i.e. when the load current steps down from a high value (e.g. around 200 A) to a medium value (e.g. around 40 A). In this case, the load current never drops to 0 A i.e. from a high or medium value to a low value. Yet, the power stage 100 does not remain in the ATRL_HiZ state during the entire step-down load event. Instead, the ATR unit 114 forces the power stage 100 to switch from the ATRL_HiZ state to the ATRL state when the Ton_Max time limit expires by forcing the low-side power transistors into the conducting state as previously described herein.

The ATR unit 114 can also switch the low-side transistors from the conducting state back to the non-conducting during a step-down load event after each low-side transistor spends a predetermined amount of time (Toff_min) in the conducting state and if the measured inductor current (on an individual or total basis) continues to remain above the positive threshold value (Imin) after Toff_min lapses e.g. as shown in FIG. 6. The ATR unit 114 can maintain the low-side transistors in the conducting state during the entire step-down load event if the measured inductor current (on an individual or total basis) always remains below the positive threshold value during the step-down load event e.g. as shown in FIG. 5.

The ATR unit 114 can be implemented digitally as part of the DC-DC converter controller 108, or as a separate component such as an ASIC. In other embodiments, the function of the ATR unit 114 is implemented using analog circuitry.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A DC-DC converter having an output node for connecting to a load, comprising:
   a power stage comprising a first power transistor connected between a voltage supply node and a common node, and a second power transistor connected between a reference node and the common node;
   an inductor connected between the common node and the output node; and
   a controller operable to sense the inductor current, detect a step-down event at the load, determine if the sensed inductor current exceeds a positive threshold value above zero during the step-down event, force the first transistor off and the second transistor off simultaneously if the sensed inductor current exceeds the positive threshold value during the step-down event so as to tri-state the power stage and dissipate the inductor current through a body diode of the second power transistor, maintain the power stage in the tri-state for a predetermined amount of time greater than zero, and continue to maintain the power stage in the tri-state so long as (i) the step-down load event continues to subsist, (ii) the sensed inductor current remains greater than the positive threshold value, and (iii) the power stage has not been in the tri-state for longer than a maximum allowed tri-state period.

2. The DC-DC converter according to claim 1, wherein the positive threshold value is programmable.

3. The DC-DC converter according to claim 1, wherein the controller is further operable to force the second transistor on again during the step-down event if the sensed inductor current drops below a second threshold value before the maximum allowed tri-state period lapses.

4. The DC-DC converter according to claim 3, wherein the positive threshold value and the second threshold value are set to the same value.

5. The DC-DC converter according to claim 3, wherein both threshold values are programmable.

6. DC-DC converter according to claim 1, wherein the controller is further operable to force the second transistor on again during the step-down event if the sensed inductor current drops below the positive threshold value before the maximum allowed tri-state period lapse.

7. The DC-DC converter according to claim 6, wherein the maximum allowed tri-state period is programmable.

8. The DC-DC converter according to claim 7, wherein the maximum allowed tri-state period is selected so that the second transistor is switched on again during the step-down event before a driver of the second transistor enters a low power sleep mode.

9. The DC-DC converter according to claim 6, wherein the controller is further operable to force the second transistor off again during the step-down load event after the second transistor is on for a minimum on time, if the inductor current remains above the positive threshold value after the minimum on time lapses.

10. The DC-DC converter according to claim 1, wherein the first and second transistors are collectively further operable to supply high current, medium current and low current to the load depending on operating conditions at the load, wherein the step-down load event occurs when the load current changes from high-to-low, high-medium or medium-to-low, wherein the controller is further operable to force the first transistor off and the second transistor on during a high-to-medium or medium-to-low step-down load current event, and wherein the controller is further operable to force the first transistor off and the second transistor off simultaneously during a high-to-low step-down load current event.

11. The DC-DC converter according to claim 1, wherein the controller is further operable to control the first and second transistors via a variable duty cycle control signal input to the first and second transistors, and wherein the controller is further operable to override the variable duty cycle control signal to the second transistor during the step-down load event.

12. The DC-DC converter according to claim 1, further comprising a comparator operable to detect the step-down event by comparing the sensed inductor current against the positive threshold value.

13. A multi-phase DC-DC converter, comprising:
   a power stage including a plurality of phases, each phase having a high-side transistor and a low-side transistor for coupling to a load through a respective inductor;
   a pulse width modulator operable to switch the phases of the power stage via a variable duty cycle control signal for delivering current to the load through one or more of the inductors;
   a controller operable to sense the individual inductor currents, detect a step-down event at the load, and determine if the sensed inductor current in any of the inductors or collectively in all of the inductors exceeds a positive threshold value above zero during the step-down event; and
   a transient response unit operable to force the high-side transistors off and the low-side transistors off simultaneously if the sensed inductor current in any of the inductors or collectively in all of the inductors exceeds the positive threshold value during the step-down event so as to tri-state the power stages and dissipate the inductor currents through a body diode of the respective low-side transistors, maintain the power stages in the tri-state for a predetermined amount of time greater than zero, and continue to maintain the power stages in the tri-state so long as (i) the step-down load event continues to subsist, (ii) the sensed inductor current in any of the inductors or collectively in all of the inductors remains greater than the positive threshold value, and (iii) the power stages have not been in the tri-state for longer than a maximum allowed tri-state period.

14. The multi-phase DC-DC converter according to claim 13, wherein the transient response unit is further operable to force the low-side transistors on again during the step-down event if the sensed inductor current in any of the inductors or collectively in all of the inductors drops below a second threshold value before the maximum allowed tri-state period lapses.

15. The multi-phase DC-DC converter according to claim 13, wherein the transient response unit is further operable to force the low-side transistors on again during the step-down event if the sensed inductor current in any of the inductors or collectively in all of the inductors drops below the positive threshold value before the maximum allowed tri-state period lapse.

16. The multi-phase DC-DC converter according to claim 15, wherein the transient response unit is further operable to force the low-side transistors off again during the step-down load event after the low-side transistors are on for a minimum on time, if the sensed inductor current in any of the inductors or collectively in all of the inductors remains above the positive threshold value after the minimum on time lapses.

17. The multi-phase DC-DC converter according to claim 15, wherein the high-side and low-side transistors are collectively further operable to supply high current, medium current and low current to the load depending on operating conditions at the load, wherein the step-down load event occurs when the measured load current changes from high-to-low, high-medium or medium-to-low, wherein the transient response unit is further operable to force the high-side transistors off and the low-side transistors on during a high-to-medium or medium-to-low step-down load current event, and wherein the transient response unit is further operable to force the high-side transistors off and the low-side transistors off during a high-to-low step-down load current event.

18. A method of operating a DC-DC converter including a power stage with a first power transistor connected between a voltage supply node and a common node, a second power transistor connected between a reference node and the common node, and an inductor connected between the common node and the output node, the method comprising:
   switching the first and second transistors via a variable duty cycle control signal to deliver current to the load through the inductor;
   sensing the inductor current;
   detecting a step-down event at the load;
   determining if the sensed inductor current exceeds a positive threshold value above zero during the step-down event;
   forcing the first transistor off during the step-down event and keeping the first transistor off during the entire step-down event;
   simultaneously forcing the second transistor off during the step-down event irrespective of the state of the variable duty cycle control signal if the sensed inductor current exceeds the positive threshold value during the step-down event so as to tri-state the power stage and dissipate the inductor current through a body diode of the second power transistor;
   maintaining the power stage in the tri-state for a predetermined amount of time greater than zero; and
   continuing to maintain the power stage in the tri-state so long as (i) the step-down load event continues to subsist, (ii) the sensed inductor current remains greater than the positive threshold value, and (iii) the power stage has not been in the tri-state for longer than a maximum allowed tri-state period.

19. The method according to claim 18, further comprising:
   forcing the second transistor on again during the step-down event if the sensed inductor current drops below the positive threshold value before the maximum allowed tri-state period lapse.

20. The method according to claim 19, further comprising forcing the second transistor off again during the step-down load event after the second transistor is on for a minimum on time, if the sensed inductor current remains above the positive threshold value after the minimum on time lapses.

21. The method according to claim 19, wherein the first and second transistors are collectively further operable to supply high current, medium current and low current to the load depending on operating conditions at the load, wherein the step-down load event occurs when the load current changes from high-to-low, high-medium or medium-to-low, the method further comprising:
   forcing the first transistor off and the second transistor on during a high-to-medium or medium-to-low step-down load current event; and
   forcing the first transistor off and the second transistor off simultaneously during a high-to-low step-down load current event.

22. The method according to claim 18, further comprising forcing the second transistor on again during the step-down event if the sensed inductor current drops below a second threshold value before the maximum allowed tri-state period lapses.

* * * * *

UNITED STATES PATENT AND TRADEMARK OFFICE
CERTIFICATE OF CORRECTION

PATENT NO. : 9,998,008 B2
APPLICATION NO. : 13/737331
DATED : June 12, 2018
INVENTOR(S) : A. Babazadeh et al.

It is certified that error appears in the above-identified patent and that said Letters Patent is hereby corrected as shown below:

In the Claims

Column 10, Line 3 (Claim 6, Line 1) please change "DC-DC" to -- The DC-DC --
Column 10, Line 7 (Claim 6, Line 5) please change "period lapse." to -- period lapses. --
Column 11, Line 20 (Claim 15, Line 7) please change "period lapse." to -- period lapses. --
Column 12, Line 29 (Claim 19, Line 6) please change "period lapse." to -- period lapses. --

Signed and Sealed this
Twenty-eighth Day of August, 2018

Andrei Iancu
*Director of the United States Patent and Trademark Office*